United States Patent

[11] 3,552,613

| [72] | Inventor | Walter A. Nye<br>700 Gum St. Bldg. 35 - Apt. 2035,<br>Anchorage, Alaska 99501 |
|---|---|---|
| [21] | Appl. No. | 748,683 |
| [22] | Filed | July 30, 1968 |
| [45] | Patented | Jan. 5, 1971 |

[54] SPORTSMAN'S CARGO NET
2 Claims, 4 Drawing Figs.

[52] U.S. Cl..................................................... 224/42.46,
294/77; 9/1, 9/7
[51] Int. Cl........................................................ B60r 11/00
[50] Field of Search............................................ 224/46,
42.1A, 42.1B, 42.1C, 42.01, 42.41, 42.46, 49; 9/1,
7; 294/77; 214/44B

[56] References Cited
UNITED STATES PATENTS

| 2,454,608 | 11/1948 | Meyerdick | 224/42.01 |
| 2,753,095 | 7/1956 | Barassi et al. | 224/42.1(B) |
| 2,821,335 | 1/1958 | White | 224/46 |
| 2,854,931 | 10/1958 | Campbell | 294/77X |
| 2,936,913 | 5/1960 | Watt et al. | 214/44(B) |
| 3,292,831 | 12/1966 | Moen | 294/77UX |

FOREIGN PATENTS

| 1,227,641 | 3/1960 | France | 224/42.46 |
| 1,228,920 | 3/1960 | France | 224/42.1B |
| 870,530 | 6/1961 | Great Britain | 214/44B |

Primary Examiner—Robert G. Sheridan
Assistant Examiner—Robert J. Spar
Attorney—Allen A. Dicke, Jr.

ABSTRACT: A cargo net attachable between opposite gunnels of a canoe or boat so as to transport cargo in an elevated position above the boat or canoe bottom thereby preventing the same from being wet by any water in the bottom of the vessel.

PATENTED JAN 5 1971 3,552,613
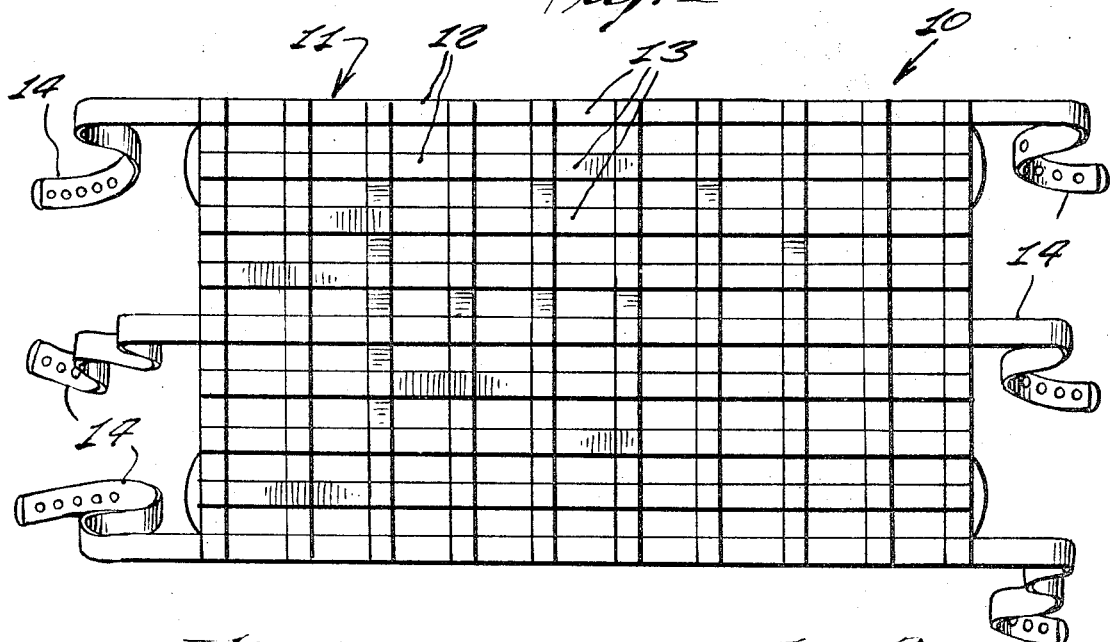
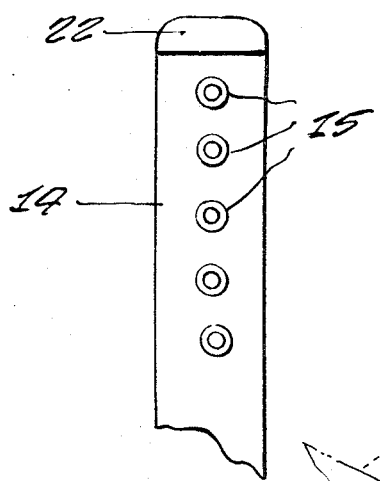
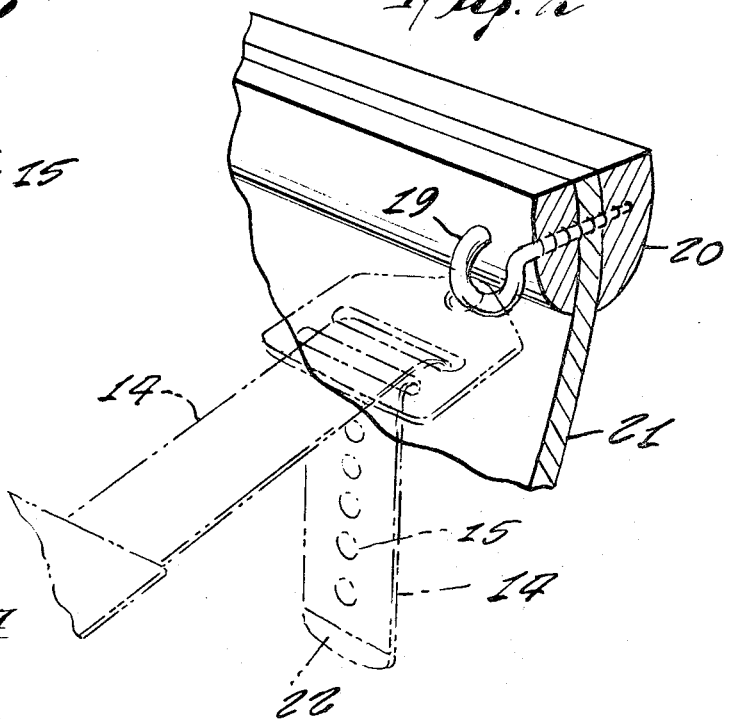
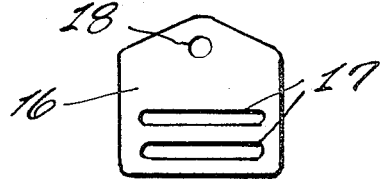
INVENTOR
WALTER A. NYE

SPORTSMAN'S CARGO NET

BACKGROUND

This invention relates generally to pallets for supporting cargo upon small boats.

The prior art abounds with nets and slings which are adapted for carrying various different kinds of material. Slings are particularly used for engaging under at least the underside and part of the sides of a load, to be lifted by a hoist mechanism so that a large and bulky load, usually composed of a plurality of smaller pieces or parts, can be handled. In their most usual application, nets are employed for catching fish, and are employed as slings for lifting the fish out of the water, into the boat or other receptacle. In these cases, the slings and nets are lifted by their edges only for the transport from one type of support of the load to another. For example, they are employed for positioning within a railway gondola to be loaded with bulk material. Thus, the sling finds utility in moving the bulk load out of the railway vehicle.

Similar devices have been used as hammocks and other supports, but no prior structure has been solely adaptable to the employment thereof as a cargo net which is attachable to an open boat to hold the cargo out of the bottom to prevent its contact with bilge water.

SUMMARY

In order to aid in the understanding of this invention, it can be stated in essentially summary form that it is directed to a sportsman's cargo net having a plurality of transverse and longitudinal rectangularly interwoven flexible tapes, with the tapes being joined together where they cross over each other. A plurality of the longitudinal tapes have means for adjustable securement, preferably being securable by buckles associated with at least one end thereof.

A principal object of the present invention is to provide a cargo net which can be adjustable supported between opposite gunnels of a canoe or boat for the purpose of supporting cargo at an elevation above the vessel bottom so to prevent water shipped into the vessel from contacting the cargo.

Another object of the present invention is to provide a cargo net which is accordingly particularly adaptable for sportsmen who generally travel in canoes or open row boats and which accordingly are liable to ship water when travelling in turbulent rivers or which are subject to catch rainwater in a sudden down pour.

Another object of the present invention is to provide a sportsman's cargo net which can be readily detached from the vessel gunnels so that the same may be used for transporting the cargo from the vessel to a camp ground.

Another object of the present invention is to provide a sportsman's cargo net which may also also serve as a cache for protecting food from wild animals while in camp, by securing the food within the cargo net and suspending the same from an overhead tree limb where it is out of reach of animals which may maraud the camp site while the hunters are away.

Other objects of the present invention are to provide a sportsman's cargo net which is simple in design, inexpensive to manufacture, rugged in construction, easy to use and efficient in operation.

These and other objects will be readily evident upon a study of the following portion of the specifications and the accompanying drawings.

BRIEF DESCRIPTION OF THE DRAWINGS

FIG. 1 is a plan view of the present invention;

FIG. 2 is a fragmentary perspective view of a boat or canoe gunnel showing securement means for the cargo net;

FIG. 3 is a plan view of a strap end; and

FIG. 4 is a plan view of a buckle incorporated therewith.

DESCRIPTION OF THE PREFERRED EMBODIMENT

Referring now to the drawing in detail, the reference numeral 10 represents a sportsman's cargo net according to the present invention wherein there is a woven panel 11 comprised of longitudinal tapes 12 and transverse tapes 13 which are woven over and under each other so to form the rectangular pattern. The tapes may be made of canvas, plastic or other suitable material and may be sewn or riveted together at their crossover. A plurality of straps 14 are formed at the terminal ends of certain of the longitudinal tapes, the straps being provided with eyelets 15 for adjustment purposes.

A plurality of buckles 16 may be incorporated with the present cargo net 10, each buckle 16 comprising a flat metal plate 3 having a plurality of slots 17 for receiving a strap 14 therethrough, as shown in FIG. 2 of the drawing. Each buckle 16 further includes an opening 18 for being received over a hook 19 threadingly secured within a gunnel 20 of a canoe or boat 21. It is to be noted that the terminal end of each strap 14 is provided with a metal or stitched tip 22.

It is to be noted that doubled outside sections sandwiching the ends of the inner net may be provided for maximum strength. It is to be further noted that the cargo net may be made in any of several different sizes so as to be suitable for different size boats.

When put in use, the cargo net is preferably supported between the opposite gunnels of a boat. The hooks 19 are secured into the gunnels on the opposite sides of the boat. Straps 14 are engaged through slot 17 in the buckle 16 so that the straps 14 on both ends of the net have buckles thereon. The openings 18 in the buckles are engaged over the hooks 19. Conventional adjustment is made by pulling the straps 14 through the buckles until the net is properly tensioned.

In the use described, the eyelets 15 are friction-enhancing devices which prevent the straps 14 from pulling out of buckle 16 under the heaviest load conditions. However, the eyelets 15 have an alternative employment. Alternatively to the employment of buckle 16 on the straps 14 on both ends of net 10, on one end of net 10, the eyelets 15 can be directly engaged over the hooks 19, while the buckle 16 on the opposite end provides for fine adjustment. Thus, the preferred structure employs buckle 16 on one end of the cargo net, while the other end may alternatively have a buckle, or the eyelets can be directly engaged on the hooks 19 in the opposite gunnel. Thus, cargo net can be attached in between the gunnels in either of two ways. In either way, the net is adjusted so that cargo placed upon the net is maintained at an elevation above the bottom of the boat to prevent cargo on the net from coming in contact with water in the boat bottom, no matter whether the water in the boat bottom was shipped over the side or originated as rain water.

When it is desired to remove the cargo from the boat, the sportsman simply lifts the straps off of the supporting hooks and carries the cargo suspended in the net. In this way, he can transfer the cargo to his campsite in one trip, providing it is not too heavy for him. When the cargo is food, it is desirable to support it away from the ground, for protection from animals. Thus, the net can be suspended from a tree limb, or the like, and serve as a saddle for the containment and support of food. In this case, the straps are preferably joined together and to a suspending rope, which extends from the tree limb. Accordingly, the sportsman's cargo net of this invention has wide versatility, but its preferred use is as a cargo net in a canoe or small boat to keep the cargo out of the bilge water.

While various changes may be made in the detailed construction, it is understood that such changes will be within the spirit and scope of the present invention as is defined by the appended claims. 4

I claim:

1. A sportsman's cargo net said sportsman's cargo net comprising:

a latticed panel for supporting a cargo thereon, said latticed panel comprising a plurality of transverse and longitudinally extending tapes, said tapes being woven over and under each other at crossover points to form a rectangular pattern, said tapes being joined together at their crossover points; and said sportsman's net having support means integrally formed with said panel for securing said cargo net between opposite gunnels of a vessel, said support means comprising several of said longitudinal tapes extending beyond said latticed panel to form straps, each of said straps including a plurality of eyelets for adjustable securement of said straps to the gunnels said eyelets being located adjacent the terminal end of each of said straps.

2. The combination as set forth in Claim 1 wherein a plurality of buckles are provided with said net, each one of said buckles being associated with one of said straps, each said buckle comprising a flat plate of metal, said plate having a pair of slots therethrough, said slots being in parallel relation to each other, and each said buckle including an opening for receiving therein a hook secured to each said gunnel of said boat.